Patented July 3, 1945

2,379,604

UNITED STATES PATENT OFFICE 2,379,604

COATING COMPOSITIONS CONTAINING BENZYL CELLULOSE

Robert C. Swain, Riverside, and Pierrepont Adams, Stamford, Conn., assignors to American Cyanamid Company, New York, N. Y., a corporation of New York No Drawing. Application September 20, 1940, Serial No. 357,610

5 Claims. (Cl. 260—15)

This invention relates to coating compositions containing benzyl cellulose and melamine-formaldehyde resin.

An object of this invention is to improve the physical and chemical properties of benzyl cellulose coating compositions, e. g., light stability, color, etc.

Another object of this invention is to improve the physical properties of coating compositions containing melamine-formaldehyde resins.

Still another object of this invention is to provide compositions containing benzyl cellulose and compatible proportions of compatible melamine-formaldehyde resins.

These and other objects are attained by blending benzyl cellulose with a melamine-formaldehyde resin which has been alkylated with an alcohol containing from 4 to 6 carbon atoms, and wherein the molal ratio of formaldehyde to melamine is at least about 4:1.

The following examples in which the proportions are in parts by weight are given by way of illustration and not in limitation.

Example 1

| | Parts |
|---|---|
| Melamine-formaldehyde resin "A" | 10 |
| Benzyl cellulose | 90 |

A composition containing these ingredients is prepared by admixing 20 parts of melamine-formaldehyde resin "A" solution (50% resin) with 450 parts of "Benzyl cellulose stock solution" (containing 20% of benzyl cellulose, 16% of ethanol (Formula 2B Anhydrous) and 64% of xylene). Films of the composition are applied to metal objects and baked at a temperature of about 135° C. for about one-half hour. The product is a hard, transparent coating having good film strength.

Example 2

| | Parts |
|---|---|
| Melamine-formaldehyde resin "B" | 25 |
| Benzyl cellulose | 75 |

A composition containing these ingredients is prepared by admixing 50 parts of melamine-formaldehyde resin "B" solution (50% resin) with 375 parts of "Benzyl cellulose stock solution." Films of the composition are applied to metal objects and baked at a temperature of about 135° C. for about one-half hour. A film having excellent chemical resistance is formed.

Example 3

| | Parts |
|---|---|
| Melamine-formaldehyde resin "C" | 50 |
| Benzyl cellulose | 50 |

A composition containing these ingredients is prepared by admixing 100 parts of melamine-formaldehyde resin "C" solution (50% resin) with 250 parts of "Benzyl cellulose stock solution." Films of the composition are applied to metal objects and baked at a temperature of about 135° C. for about one-half hour. A clear, tough film is formed.

Example 4

| | Parts |
|---|---|
| Melamine-formaldehyde resin "B" | 75 |
| Benzyl cellulose | 25 |

A composition containing these ingredients is prepared by admixing 150 parts of melamine-formaldehyde resin "B" solution (50% resin) with 125 parts of "Benzyl cellulose stock solution." Films of the composition are applied to sheet metal and baked at a temperature of about 135° C. for about one-half hour. The product is a clear, water-white film which is extremely mar-resistant.

Example 5

| | Parts |
|---|---|
| Melamine-formaldehyde resin "A" | 90 |
| Benzyl cellulose | 10 |

A composition containing these ingredients is prepared by admixing 180 parts of melamine-formaldehyde resin "A" solution (50% resin) with 50 parts of "Benzyl cellulose stock solution." Films of the composition are applied to metal objects and baked at a temperature of about 135° C. for about one-half hour. The product formed is a very hard, clear coating.

Example 6

The composition of Example 5, preferably with about 1 part of phosphoric acid or acid ester thereof added, is applied to wood and baked at about 80° C. for about 1–4 hours. A hard, clear laquer finish is obtained.

Example 7

| | Parts |
|---|---|
| Melamine-formaldehyde resin "D" | 10 |
| Benzyl cellulose | 90 |

A composition containing these ingredients is prepared by admixing 20 parts of melamine-formaldehyde resin "D" solution (50% resin) with 450 parts of "Benzyl cellulose stock solution." Films of the composition are applied to metal objects and baked at a temperature of about 135° C. for about one-half hour. The product is a transparent, resistant coating.

Example 8

| | Parts |
|---|---|
| Melamine-formaldehyde resin "E" | 25 |
| Benzyl cellulose | 75 |

A composition containing these ingredients is prepared by admixing 50 parts of melamine-formaldehyde resin "E" solution (50% resin) with 375 parts of "Benzyl cellulose stock solution." Films of the composition are applied to metal objects and baked at a temperature of about 135° C. for about one-half hour. A film having good chemical properties is formed.

Example 9

| | Parts |
|---|---|
| Melamine-formaldehyde resin "F" | 50 |
| Benzyl cellulose | 50 |

A composition containing these ingredients is prepared by admixing 100 parts of melamine-formaldehyde resin "F" solution (50% resin) with 250 parts of "Benzyl cellulose stock solution." Films of the composition are applied to metal objects and baked at a temperature of about 135° C. for one-half hour. A hard, transparent film is produced.

Example 10

| | Parts |
|---|---|
| Melamine-formaldehyde resin "E" | 75 |
| Benzyl cellulose | 25 |

A composition containing these ingredients is prepared by admixing 150 parts of melamine-formaldehyde resin "E" solution (50% resin) with 125 parts of "Benzyl cellulose stock solution." Films of the composition are applied to metal objects and baked at a temperature of about 135° C. for about one-half hour, to give a smooth transparent surface.

Example 11

The composition of Example 10 may be mixed with about an equal proportion of a fatty oil modified phthalic glyceride resin and the resulting mixture is emulsified in water. This emulsion may be applied to cloth or paper either as a finishing material, sizing material or in textile printing processes. The resin may be cured by subjecting the coated or impregnated material to a temperature of about 135° C. for several minutes.

Example 12

| | Parts |
|---|---|
| Melamine-formaldehyde resin "D" | 90 |
| Benzyl cellulose | 10 |

A composition containing these ingredients is prepared by admixing 180 parts of melamine-formaldehyde resin "D" solution (50% resin) with 50 parts of "Benzyl cellulose stock solution." Films of the composition are applied to metal objects and baked at a temperature of about 135° C. for about one-half hour. The product is a hard, transparent coating which has good film strength.

Example 13

The composition of Example 12 is applied to paper or cloth as a coating or impregnating composition and it is subjected to a temperature of about 135° C. for 3 minutes or until completely cured. Various textile finishes and paper finishes may be produced in this manner as well as articles suitable for use as insulating materials.

Example 14

Paper or cloth sheets are impregnated with the composition of Example 12 and the impregnated sheets are dried, cut if desired, stacked and pressed under hot platens under a pressure of about 2000 pounds per square inch to yield laminated materials of high strength and having good electrical properties.

The melamine-formaldehyde resins vary slightly according to minor variations in control during their production and in some instances small proportions of a suitable solvent material, e. g., the monoethyl ether of ethylene glycol ("Cellosolve"), acetone, ethyl acetate, etc., may be added to the original solutions of benzyl cellulose and melamine-formaldehyde resin in order to produce perfectly clear solutions if such solutions are not originally obtained.

*Preparation of melamine-formaldehyde resin "A"*

| | Parts |
|---|---|
| Melamine (1 mol) | 126 |
| Formalin (4 mols) (37% formaldehyde in water) | 324.4 |
| n-Butanol | 440 |

This mixture is placed in a reflux apparatus which is provided with a condenser and a suitable water trap through which the reflux condensate passes on its return to the reaction chamber and in which the essentially aqueous fraction of the condensate may be separated from the essentially non-aqueous fraction and means is provided so that the former fraction may be drawn off if desirable. The reaction mixture is refluxed at a temperature of about 91–93° C. at atmospheric pressure for 6–12 hours. The water is removed by azeotropic distillation from the reaction mixture during the reflux operation beginning preferably after about 2–5 hours have elapsed and the water so removed is separated from the reflux condensate in the water trap. During the distillation about 550 additional parts of butanol are added gradually. When the reflux condensate is substantially anhydrous the vapor temperature will be about 100–105° C. The pressure is lowered sufficiently to reduce the vapor temperature to about 85–90° C. and the resin solution is concentrated to about 60–70% solids by vacuum distillation. The resulting resin solution may be diluted to about 50% solids with any desired solvent or diluent, e. g., xylene.

*Preparation of melamine-formaldehyde resin "B"*

| | Parts |
|---|---|
| Melamine (1 mol) | 126 |
| Formalin (5 mols) (37% formaldehyde in water) | 405.5 |
| n-Butanol | 440 |

This mixture is placed in a reflux apparatus which is provided with a condenser and a suitable water trap through which the reflux condensate passes on its return to the reaction chamber and in which the essentially aqueous fraction of the condensate may be separated from the essentially non-aqueous fraction and means is provided so that the former fraction may be drawn off if desirable. The reaction mixture is refluxed at a temperature of about 91-93° C. at atmospheric pressure for 6-12 hours. The water is removed by azeotropic distillation from the reaction mixture during the reflux operation beginning preferably after about 2-5 hours have elapsed and the water so removed is separated from the reflux condensate in the water trap. During the distillation about 550 additional parts of butanol are added gradually. When the reflux condensate is substantially anhydrous the vapor temperature will be about 100-105° C. The pressure is lowered sufficiently to reduce the vapor temperature to about 85-90° C. and the resin solution is concentrated to about 60-70% solids by vacuum distillation. The resulting resin solution may be diluted to about 50% solids with any desired solvent or diluent, e. g., xylene.

*Preparation of melamine-formaldehyde resin "C"*

|  | Parts |
|---|---|
| Melamine (1 mol) | 126 |
| Formalin (6 mols) (37% formaldehyde in water) | 486.6 |
| n-Butanol | 440 |

This mixture is placed in a reflux apparatus which is provided with a condenser and a suitable water trap through which the reflux condensate passes on its return to the reaction chamber and in which the essentially aqueous fraction of the condensate may be separated from the essentially non-aqueous fraction and means is provided so that the former fraction may be drawn off if desirable. The reaction mixture is refluxed at a temperature of about 91-93° C. at atmospheric pressure for 6-12 hours. The water is removed by azetropic distillation from the reaction mixture during the reflux operation beginning preferably after about 2-5 hours have elapsed and the water so removed is separated from the reflux condensate in the water trap. During the distillation about 550 additional parts of butanol are added gradually. When the reflux condensate is substantially anhydrous the vapor temperature will be about 100-105° C. The pressure is lowered sufficiently to reduce the vapor temperature to about 85-90° C. and the resin solution is concentrated to about 60-70% solids by vacuum distillation. The resulting resin solution may be diluted to about 50% solids with any desired solvent or diluent, e. g., xylene.

*Preparation of melamine-formaldehyde resin "D"*

|  | Parts |
|---|---|
| Melamine | 283 |
| Formalin (37% formaldehyde in water) | 978 |

This mixture is heated at about 70-80° C. until a homogeneous solution is obtained. The pH is adjusted to about 7.3 with caustic and vacuum concentrated to remove about 50-60% of the free water. Sufficient phosphoric acid is added to neutralize the caustic present and then 320 parts of methanol are added. Wet methanol is gradually distilled off from the mixture and dry methanol is added at about the same rate as wet methanol is distilled off. This distillation and addition of methanol is continued until the distillate is substantially dry methanol. During this operation which requires about four hours, about 1600 parts of methanol are added. 707 parts of "Pentasol" (trade name of Sharples Solvents Corporation for mixed amyl alcohols) are added and the distillation is continued until the vapor temperature rises to about 100-105° C. About 710 parts of the distillate are collected. The pressure is lowered sufficiently to reduce the temperature to 80-90° C. and 178 parts more of the distillate are collected, leaving as a product a resin solution containing 50% of resin solids in "Pentasol."

*Preparation of melamine-formaldehyde resin "E"*

|  | Parts |
|---|---|
| Melamine (1 mol) | 126 |
| Formalin (5 mols) (37% formaldehyde in water) | 405.5 |
| n-Hexyl alcohol | 500 |
| Methanol | 200 |

This mixture is placed in a reflux apparatus which is provided with a condenser and a suitable water trap through which the reflux condensate passes on its return to the reaction chamber and in which the essentially aqueous fraction of the condensate may be separated from the essentially non-aqueous fraction and means is provided so that the former fraction may be drawn off if desirable. The reaction mixture is refluxed at a temperature of about 80-85° C. at atmospheric pressure for 6-12 hours. The water is removed by azeotropic distillation from the reaction mixture during the reflux operation beginning preferably after about 2-5 hours have elapsed and the water so removed is separated from the reflux condensate in the water trap. When the reflux condensate is substantially anhydrous the vapor temperature will be about 100-105° C. The pressure is lowered sufficiently to reduce the vapor temperature to about 85-90° C. and the resin solution is concentrated to about 60-70% solids by vacuum distillation. This solution is essentially a hexylated resin in hexyl alcohol, all or nearly all of the methanol having been eliminated from it during the distillation. The resulting resin solution may be diluted to about 50% solids with any desired solvent or diluent, e. g., xylene.

*Preparation of melamine-formaldehyde resin "F"*

|  | Parts |
|---|---|
| Melamine (1 mol) | 126 |
| Formalin (5 mols) (37% formaldehyde in water) | 405.5 |
| Benzyl alcohol | 600 |

This mixture is placed in a reflux apparatus which is provided with a condenser and a suitable water trap through which the reflux condensate passes on its return to the reaction chamber and in which the essentially aqueous fraction of the condensate may be separated from the essentially non-aqueous fraction and means is provided so that the former fraction may be drawn off if desirable. The reaction mixture is refluxed at a temperature of about 93-98° C. at atmospheric pressure for 6-12 hours. The water is removed by azeotropic distillation from the reaction mixture during the reflux operation beginning preferably after about 2-5 hours have elapsed and the water so removed is separated from the reflux condensate in the water trap. When the reflux condensate is substantially anhydrous the vapor temperature will be about 100-105° C. The pressure is lowered sufficiently to reduce the vapor temperature to about 85-90° C. and the resin solution is concentrated to about 60-70% solids by vacuum distillation. The resulting resin solution may be diluted to about 50% solids with any desired solvent or diluent, e. g., xylene.

Alkylated melamine-formaldehyde resins may be produced in accordance with the procedures outlined above, as well as in any other suitable manner. Aqueous syrups of melamine-formaldehyde resins may be first produced and then alkylated either simultaneously with dehydration or subsequent to dehydration. Generally the simultaneous condensation of melamine, formaldehyde and a suitable alcohol is used because of convenience. In order to facilitate the alkylation with the higher alcohols, e. g., the amyl alcohols, the hexyl alcohols and the octanols, a low boiling alcohol such as methanol or butanol may be mixed with the higher alcohol, thereby assisting in removing the water and causing the reaction to take place readily at somewhat lower temperatures than would otherwise be required. The low boiling alcohol is removed by distillation after the reaction is completed. Another method for producing resins alkylated with higher alcohols is to alkylate the melamine-formaldehyde resin with a low boiling alcohol such as methanol and subsequently replacing it with the desired higher alcohol, distilling out the low boiling alcohol. The condensation may be carried out either with or without an acid catalyst and in some instance basic catalysts may desirably be utilized.

While formaldehyde has been used in the previous examples, it will be obvious that the various polymers of formaldehyde or substances which yield formaldehyde may be used in place of part or all of the formaldehyde.

As indicated by the above examples benzyl cellulose has been found to be compatible with melamine-formaldehyde resins wherein the molal ratio of formaldehyde to melamine is at or above about 4:1. While higher ratios of formaldehyde to melamine than 6:1 may be used, it is generally undesirable inasmuch as formaldehyde is lost during the curing so that usually the product in its cured condition does not contain more than about 6 mols of formaldehyde to 1 mol of melamine.

The resins may be alkylated with any of the alcohols containing from 4 to 6 carbon atoms and it has also been found that a melamine-formaldehyde resin (ratio 1:5.5) which is alkylated with ethylene chlorohydrin is compatible with benzyl cellulose in amounts up to about 10-20% of melamine resin on a total solids weight basis. The term "alkylated melamine-formaldehyde resin" is intended to denote compositions which are reacted with an alcohol.

Compositions made according to the present invention have much better color and light stability than the benzyl cellulose compositions not containing melamine-formaldehyde resins. On the other hand, the electrical properties of benzyl cellulose are largely retained. The compositions are quite heat resistant and have especially good alkali resistance, acid resistance and water resistance. Benzyl cellulose which is soluble in alcohol and dioxane and to a lesser extent in toluene is rendered substantially insoluble in these materials if substantial amounts of the melamine-formaldehyde resin be present. Accordingly, such compositions find wide use in coating applications where damage by solvents is likely.

Our products may be plasticized with a wide variety of materials such as alkyl phthalates, tricresyl phosphate, various alkyd resins, particularly the fatty oil acid modified alkyd resins, etc.

Very desirable compositions are produced by admixing 1 part of a soya-bean oil modified phthalic glyceride alkyd resin with an equal part of one of our mixtures of benzyl cellulose and melamine-formaldehyde resin.

Various fillers, pigments, dyes and lakes may be added to our compositions, e. g., lithopone, zinc oxide, titanium oxide, ferric oxide, Prussian blue, toluidine red, malachite green, mica, glass fibers, ground glass, powdered silica, etc.

Curing catalysts may be incorporated in the compositions to effect a more rapid curing of the melamine-formaldehyde resins or to enable the resin to be cured at lower temperatures than indicated in the above examples. Such substances are, for instance, phosphoric acid, ammonium salts of phosphoric acid, etc.

Other resinous compositions may be included in various coating compositions, e. g., urea-formaldehyde resins, phenol-formaldehyde resins, ethyl cellulose, cellulose acetate, nitrocellulose, etc.

Our compositions are especially suitable for use in lacquers, paints and enamels, as well as in printing inks. They are particularly suitable for application in insulating lacquers.

Obviously, many modifications and variations in the processes and compositions described above may be made without departing from the spirit and scope of the invention as defined in the appended claims.

We claim:

1. A coating composition containing benzyl cellulose and a melamine-formaldehyde resin which has been reacted with an alcohol containing from four to six carbon atoms and wherein the molal ratio of formaldehyde to melamine is at least about 4:1.

2. A coating composition containing benzyl cellulose and a melamine-formaldehyde resin which has been reacted with butyl alcohol and wherein the molal ratio of formaldehyde to melamine is at least about 4:1.

3. A coating composition containing benzyl cellulose and a melamine-formaldehyde resin which has been reacted with benzyl alcohol and wherein the molal ratio of formaldehyde to melamine is at least about 4:1.

4. A coating composition containing benzyl cellulose and a melamine-formaldehyde resin which has been reacted with hexyl alcohol and wherein the molal ratio of formaldehyde to melamine is at least about 4:1.

5. A coating composition containing benzyl cellulose and a melamine-formaldehyde resin which has been reacted with an alcohol containing from 4 to 6 carbon atoms and wherein the molal ratio of formaldehyde to melamine is between about 4:1 and about 6:1.

ROBERT C. SWAIN.
PIERREPONT ADAMS.